Jan. 11, 1955  G. E. FLINN  2,699,073
TRANSMISSION
Filed Aug. 16, 1950  4 Sheets-Sheet 1
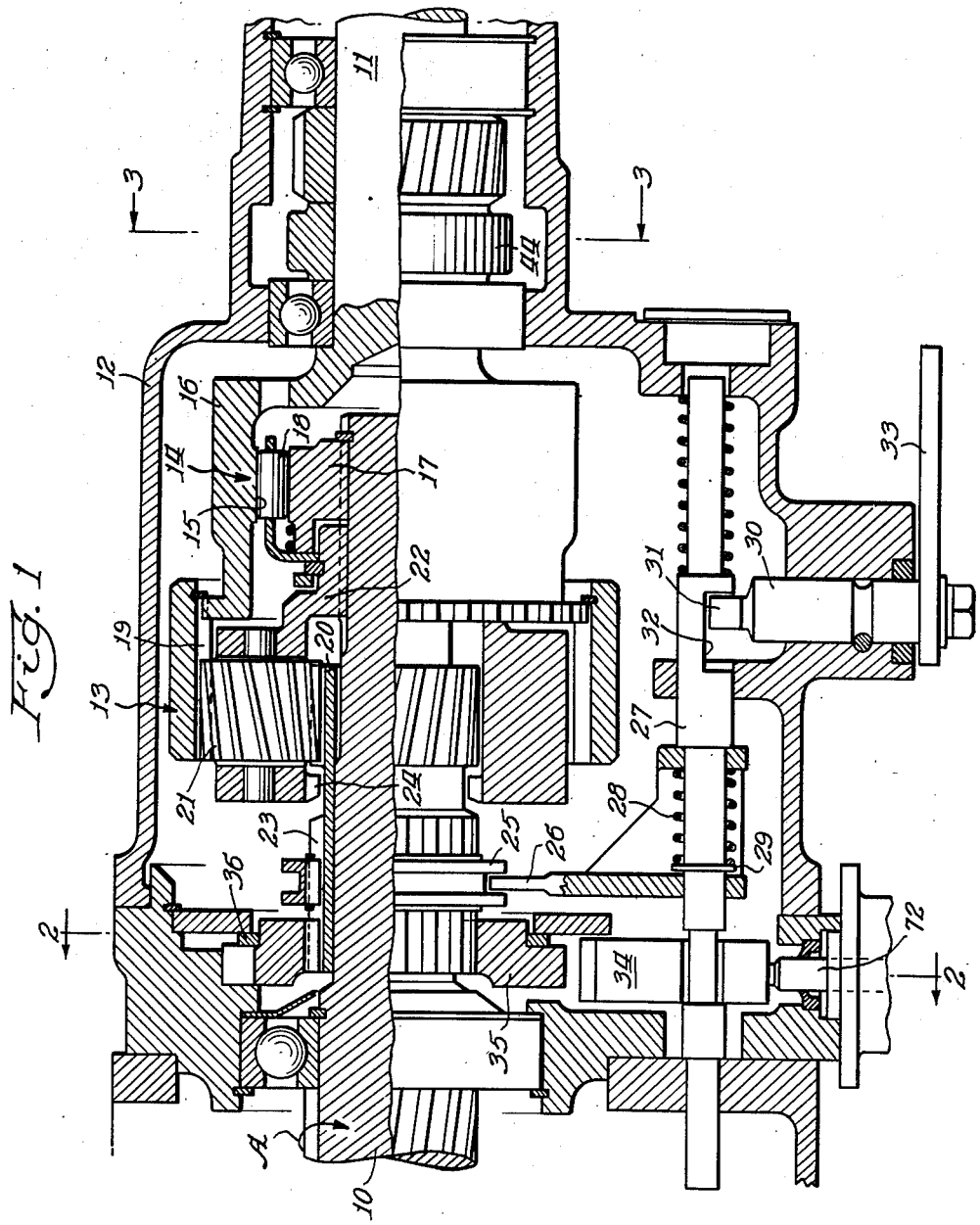
Inventor:
George E. Flinn

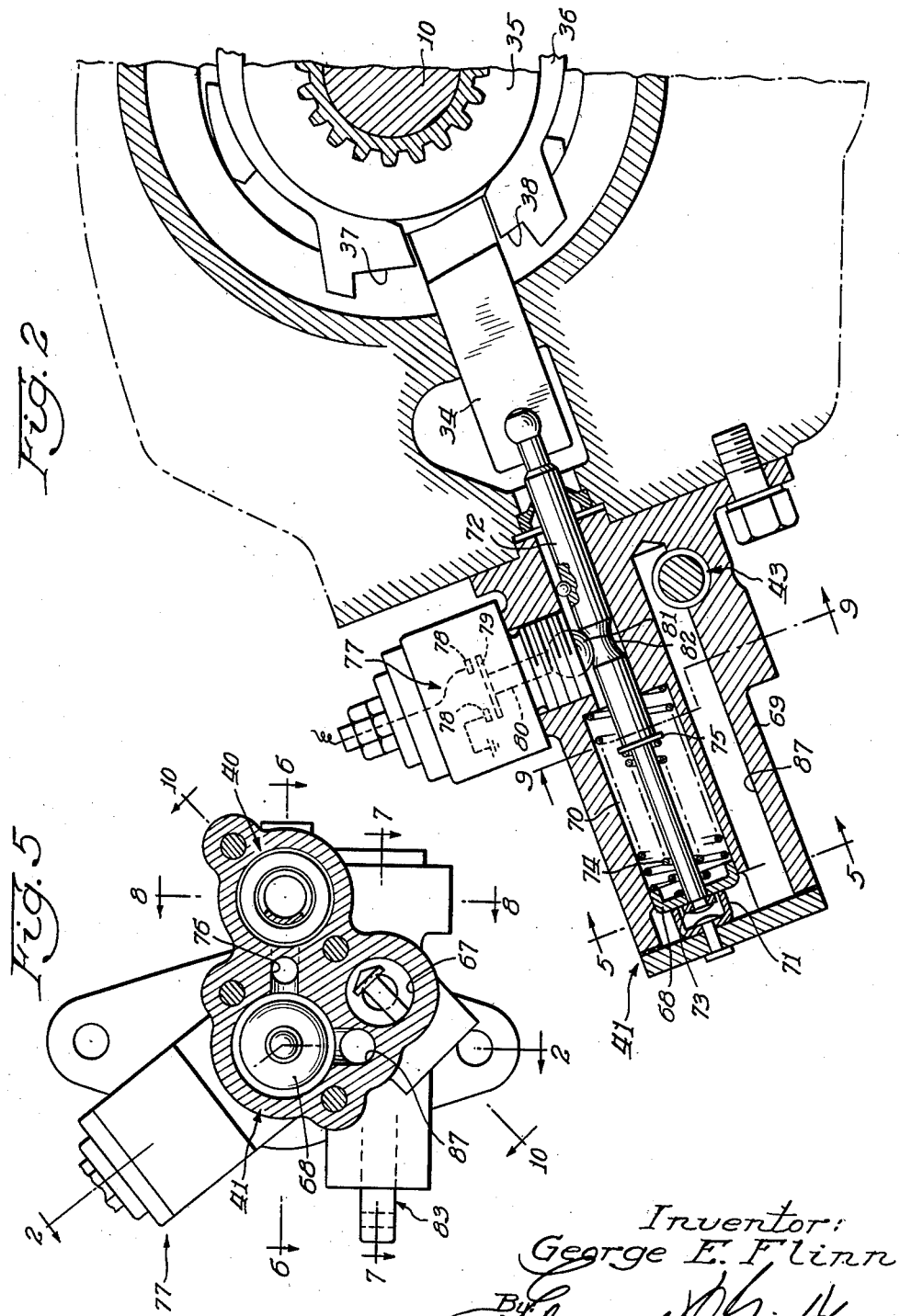

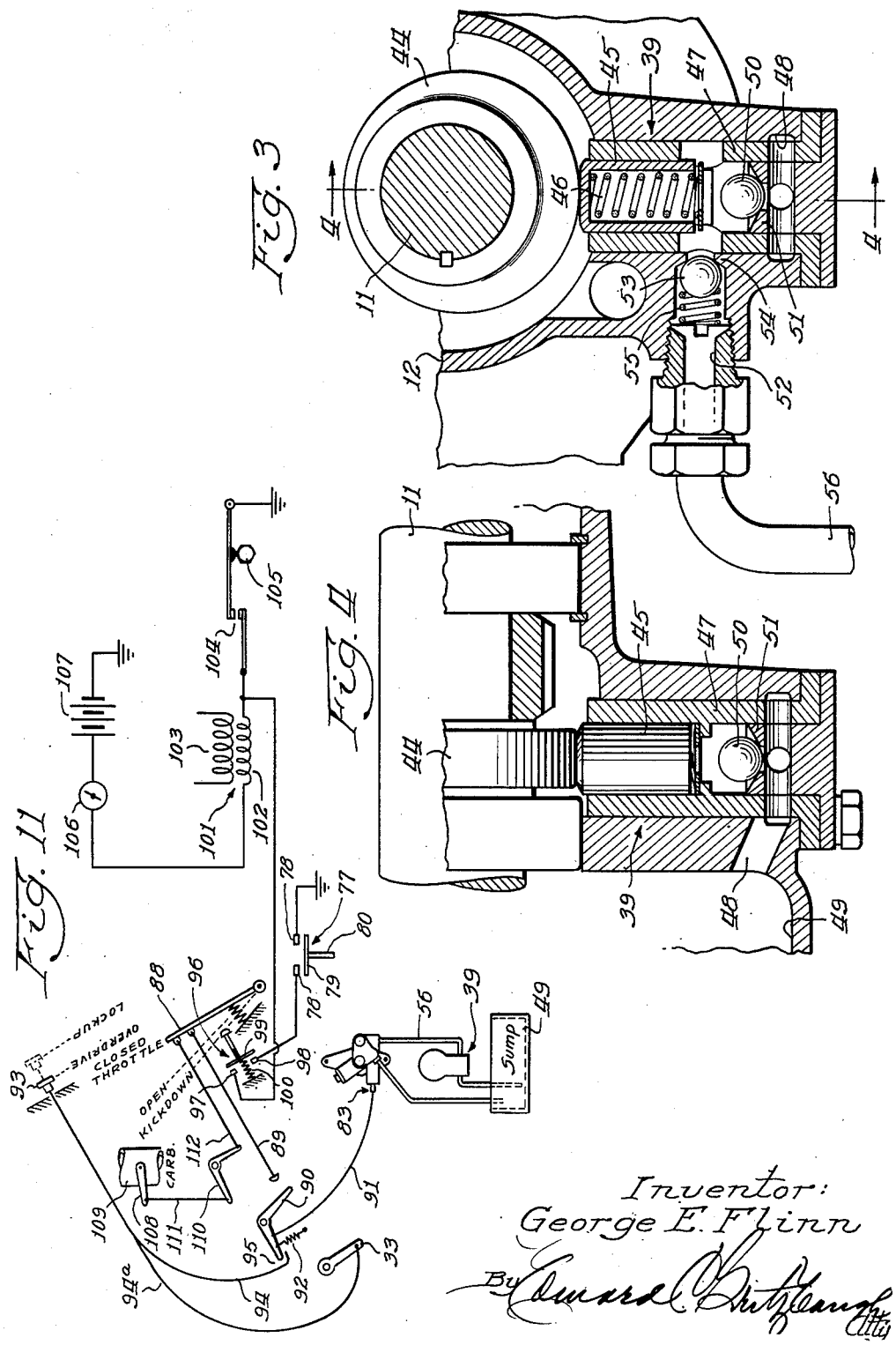

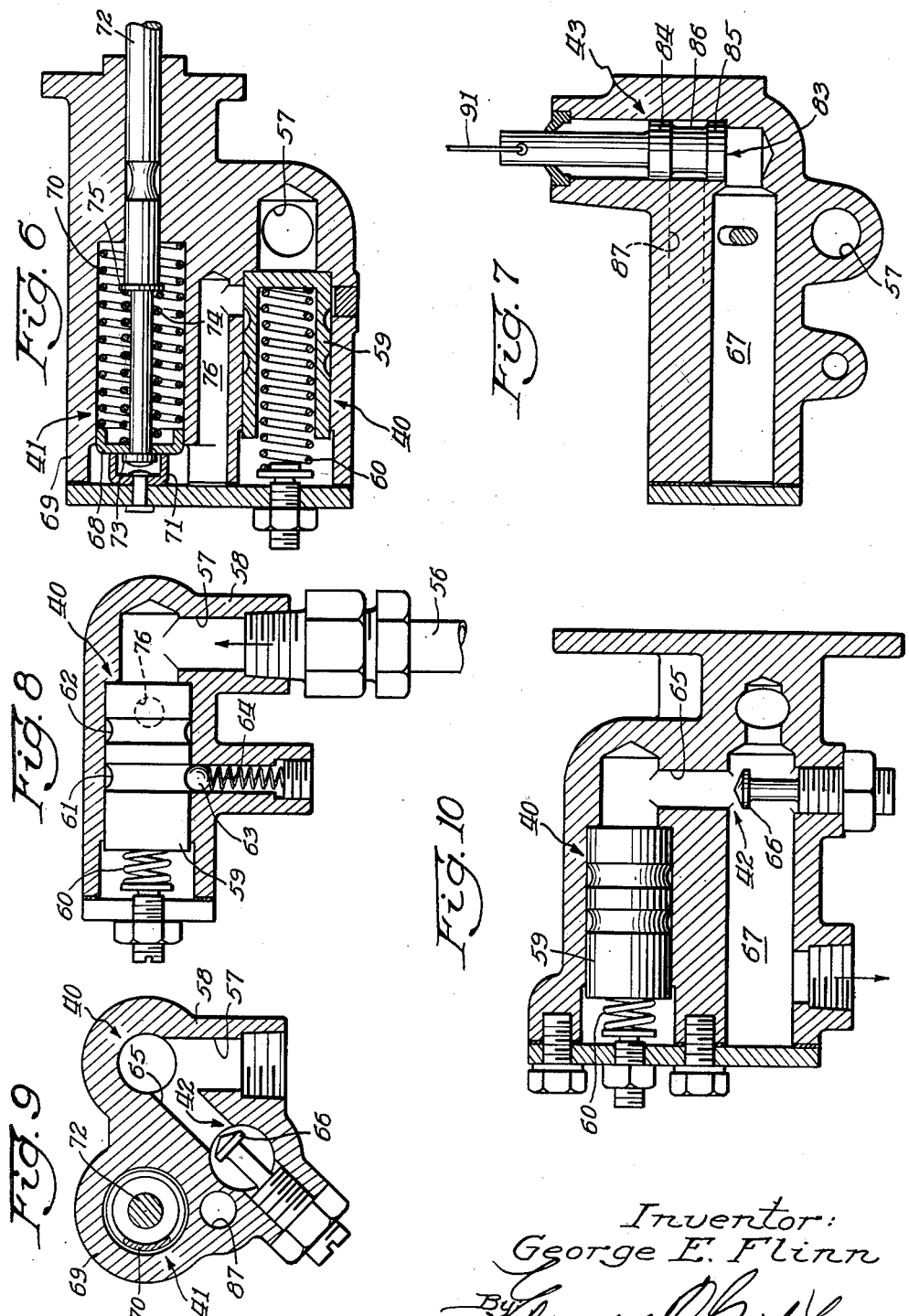

United States Patent Office 2,699,073
Patented Jan. 11, 1955

2,699,073

TRANSMISSION

George E. Flinn, Muncie, Ind., assignor to Borg-Warner Corporation, Chicago, Ill., a corporation of Illinois Application August 16, 1950, Serial No. 179,855

16 Claims. (Cl. 74—472)

The invention relates to transmissions for automotive vehicles and more particularly to transmissions commonly known as overdrives which are used as auxiliary transmissions in tandem with ordinary manually controlled three-speed transmissions.

Such transmissions of the overdrive type commonly provide a one-way direct drive between drive and driven shafts and an overspeed drive for use in lieu of the one-to-one drive. The transmissions generally include a pawl movable into engagement with a slotted disc fixed with respect to an element of a planetary gear set, with the arrangement being such that when the slotted element is held stationary by the pawl, the planetary gear set drives the driven shaft of the transmission at the overspeed drive. The pawl is generally moved into and out of engagement by an electric solenoid, and an electric governor is used in conjunction with the driven shaft of the transmission and is connected electrically with the solenoid, so that the pawl is moved toward engagement with the slotted element at a predetermined speed of the driven shaft of the transmission.

It is an object of the present invention to provide an improved hydraulic control system for use in lieu of the electrical controls just mentioned, and which is contemplated to be more reliable than any such electrical controls, the hydraulic controls utilizing a fluid pressure operated motor in lieu of the electric solenoid.

It is another object of the invention to provide an improved hydraulic governor in connection with the driven shaft of the transmission which functions to cause fluid pressure to be applied to the fluid motor and thereby cause a movement of the pawl of the overdrive transmission toward engaged position when the speed of the driven shaft reaches a predetermined value. More particularly it is an object to provide such a hydraulic governor which includes a pump driven by the driven shaft of the transmission and supplying a volume of fluid that varies in accordance with the speed of the driven shaft and which discharges through an orifice functioning to cause the pressure of the fluid discharged by the pump to increase and decrease in accordance with the volume of fluid discharged by the pump and thereby in accordance with the speed of the driven shaft of the transmission.

It is also an object of the invention to provide valve means in connection with the hydraulic arrangement just described which relieves the fluid pressure on the hydraulic motor for the pawl when the automobile accelerator is moved to an open throttle kickdown position, whereby the pawl may be withdrawn from the slotted element under such conditions to change the transmission from overspeed ratio to direct drive for utilizing the greater torque in direct drive when it is desired by the vehicle operator.

It is also an object of the invention to provide an improved arrangement in such a hydraulic control system for locking up the overdrive gear set to provide a two-way direct drive between the shafts and at the same time assuring that the hydraulic motor for the pawl will not become actuated for moving the pawl into its overdrive engaged position for overspeed ratio.

The invention consists of the novel constructions, arrangements and devices to be hereinafter described and claimed for carrying out the above-stated objects and such other objects as will appear from the following description of a preferred embodiment of the invention illustrated with reference to the accompanying drawings, wherein:

Fig. 1 is a longitudinal sectional view of an overdrive transmission with which my improved controls may be used;

Fig. 2 is a sectional view taken on line 2—2 of Fig. 1 and on line 2—2 of Fig. 5;

Fig. 3 is a sectional view taken on line 3—3 of Fig. 1;

Fig. 4 is a sectional view taken on line 4—4 of Fig. 3;

Fig. 5 is a sectional view taken on line 5—5 of Fig. 2;

Figs. 6, 7 and 8 are sectional views taken on lines 6—6, 7—7 and 8—8, respectively, of Fig. 5;

Fig. 9 is a sectional view taken on line 9—9 of Fig. 2;

Fig. 10 is a sectional view taken on line 10—10 of Fig. 5; and

Fig. 11 is an electrical diagram of the circuits and their components which may be used with the rest of the control mechanism illustrated in Figs. 2 to 10.

Like characters of reference designate like parts in the several views.

Referring now to Fig. 1, the transmission with which my improved controls is adapted to operate may be seen to comprise a drive shaft 10 and a driven shaft 11 rotatably disposed in a transmission casing 12, a planetary gear set 13 operatively connecting the shafts and a one-way clutch 14 also operatively connecting the shafts for driving when the gear set 13 is inoperative, as will hereinafter appear. The transmission is intended to be used in an automotive vehicle as part of its propelling mechanism, and the driven shaft 11 is adapted to be connected by any suitable driving mechanism with the driving road wheels of the vehicle, and the drive shaft 10 is adapted to be driven by the engine of the vehicle preferably through another change speed transmission (not shown), such as a manually controlled three forward speed type, connected in tandem with the illustrated transmission.

The one-way clutch 14 comprises an inner cylindrical race 15 formed within a bell shaped portion 16 of the driven shaft 11, a hub portion 17 fixed on the drive shaft 10 having cam portions thereon (not shown in detail) and rollers 18 disposed between the hub 17 and race 15. The rollers 18 are adapted to engage between the race 15 and the cam portions on the hub portion 17 for driving the shaft 11 from the shaft 10 in the direction of rotation indicated by the arrow A; however, the one-way clutch 14 overruns when the driven shaft 11 rotates in this direction at a faster speed than the drive shaft 10. One-way clutches of this type are well-known in the art and hence the one-way clutch 14 will not be further described in detail.

The planetary gear set 13 comprises a ring gear 19 fixed to the driven shaft 11, a sun gear 20 rotatably disposed on the drive shaft 10, a plurality of planet gears 21 (one being shown in the drawing) in mesh with the ring and sun gears and a carrier 22 for the planet gears 21 fixed to the drive shaft 10.

The sun gear 20 is provided with clutch teeth 23 adapted to mesh with clutch teeth 24 provided on the planet gear carrier 22 when the sun gear 20 is moved to the right as seen in the drawing. The sun gear has a collar 25 fixed thereon, and a shift fork 26 fits in the collar for moving the sun gear 20. The fork 26 is carried by a shaft 27 reciprocably disposed in the transmission housing 12, and a spring 28 is disposed between the shift fork 26 and a ring 29 fixed to the shaft 27. The shaft 27 is reciprocated by means of a shaft 30 having an eccentrically disposed end portion 31 fitting into a slot 32 provided in the shaft 27. The shaft 30 has a shift arm 33 fixed thereto at its outer end.

Operation of the gear set 13 is controlled by means of a reciprocable pawl 34 adapted to move into engagement with a slotted element 35 fixed on the sun gear 20. An oscillatable blocker 36 is in frictional contact with the slotted element 35, and rotation of the slotted element 35 in one direction or the other tends to move blocking lands 37 and 38 on the blocker 36 (see Fig. 2) into the path of movement of the pawl.

In operation, when the pawl 34 is retracted so as to be out of engagement with the slotted element 35, the sun gear 20 freely rotates, assuming that it is in its axial position illustrated in the figure with its clutch teeth 23 disengaged with respect to the clutch teeth 24 on the carrier 22. The drive shaft 10 then drives the driven shaft 11 through the one-way clutch 14 in a one-way direct drive. When an overdrive speed ratio is desired, the pawl 34 is moved into engagement with the slotted element 35 thus holding the sun gear 20 stationary. The drive is then from the drive shaft 10 through the planetary gear set 13 to the driven shaft 11, and the planetary gear set functions to drive the driven shaft at an overdrive or higher speed than the drive shaft. The one-way clutch 14 under these conditions overruns and disengages.

The low speed drive through the one-way clutch 14 is a one-way direct drive, as will be readily understood. A two-way direct drive, as will be readily understood. A two-way direct drive may be obtained by locking together the elements of the planetary gear set 13, so that they rotate as a unit, by engaging the clutch teeth 23 and 24. This is accomplished by moving the sun gear 20 to the right as seen in Fig. 1 by means of the lever 33 which is effective through the rod 27, the spring 28, the shift fork 26 and the collar 25. When the clutch teeth 23 and 24 are engaged, the parts of the planetary gear set 13 are locked to rotate as a unit, and the shaft 11 is driven in a two-way direct drive.

The hydraulic control system for the transmission just described comprises, in general, a hydraulic pump 39, a shift valve 40, a pawl operating hydraulic motor 41, an adjustable orifice 42, and a downshift valve 43.

The pump 39, which functions to supply fluid under pressure for operating the hydraulic control system, is of the fixed displacement type and comprises an eccentric 44 fixed on the driven shaft 11. A reciprocable piston 45 is held in contact with the eccentric 44 by means of a spring 46. The piston is slidably disposed in a casing portion 47 which is provided with an oil inlet opening 48 in communication with the oil sump 49 of the transmission located in the lower part of the housing 12. A check valve is in the passage 48 and comprises a ball 50 disposed on a seating washer 51. The casing portion 47 is provided with an outlet passage 52, and a check valve is provided in the passage 52. The latter check valve comprises a ball 53 adapted to rest on an annular seating portion 54 and held thereon by means of a spring 55.

The fluid discharge passage 52 is connected with the shift valve 40 by means of a conduit 56 and a passage 57 formed in a casing 58. The valve 40 comprises a piston 59 in the casing 58 acted on by a spring 60. The piston has two grooves 61 and 62 in its outer surface, and a detent comprising a ball 63 and a spring 64 acting on the ball is adapted to cooperate with the grooves 61 and 62 for yieldably holding the piston 59 in either of two positions.

The orifice 42 is a sharp edged orifice formed by a passage 65 and a pointed plug 66 adapted to be adjusted toward and away from the adjacent end of the passage 65. The orifice 42 is connected with the valve 40 and thereby with the pump 39 by means of the passage 65, and fluid under pressure discharged from the pump 39 will flow through the orifice 42 and will also be impressed on the piston 59 as is apparent. The orifice 42 discharges into a passage 67 which discharges into the sump 49 of the transmission.

The motor 41 comprises a piston 68 slidably disposed in a hollow casing portion 69. The piston 68 is acted on by a spring 70 tending to hold it in its illustrated position against an abutment 71 in the end of the casing portion 69. A reciprocable pawl rod 72 extends through the casing portion 69, and the piston 68 is disposed on one end of the rod 72, and a collar 73 is fixed on this end of the rod 72 to prevent movement of the piston 68 off the rod 72. A spring 74 is provided between the piston 68 and a ring 75 fixed on the rod. The piston 68 is in communication with the valve 40 by means of a passage 76 which is blocked by the valve piston 59 when the piston 59 is in its illustrated position with the detent ball 63 in the groove 61. The opposite end of the rod 72 is fixed in the pawl 34.

A switch 77 comprising two contacts 78 is actuated by the pawl rod 72. The switch comprises a movable switch blade 79 adapted to bridge the contacts 78. The blade 79 is carried by a rod 80, and a ball 81 is disposed between the rod 80 and pawl rod 72. The ball 81 is adapted to enter and be disposed in a groove 82 provided in the rod 72. The switch and rod are so arranged that the contacts 78 are open when the rod 72 is in its illustrated position, but, when the rod is moved to engage the pawl, the switch blade 79 closes and bridges the contacts 78.

The valve 43 comprises a piston 83 having lands 84 and 85 and a groove 86. The valve is connected by means of a passage 87 with the end of the piston 68, and the valve is also connected with the passage 67 discharging into the fluid sump 49.

The valve piston 83 is adapted to be controlled by the accelerator 88 of the vehicle (see Fig. 11). The accelerator is arranged to actuate a rod 89 which in turn is effective on one arm of a bell-crank 90. The other arm of the bell-crank 90 is connected by means of a Bowden or flexible wire 91 with the valve piston 83, so that, when the accelerator is moved to an open throttle kickdown position, the bell-crank 90 is rotated and through the Bowden wire moves the valve piston 83. A spring 92 is provided for yieldably holding the bell-crank 90 and valve piston 83 in their illustrated positions.

A control knob 93, preferably located on the control panel of the vehicle in front of the driver, is connected by a Bowden wire 94 with the bell-crank 90, and a one-way connection 95 is provided between the Bowden wire 94 and the bell-crank, so that the bell-crank may have clockwise movement as seen in the drawing without corresponding movement of the control knob 93. The control knob 93 is also connected by means of a branch 94a of the Bowden wire 94 with the control lever 33, so that the control knob 93 may be utilized for moving the lever 33.

The transmission control system includes the electrical controls shown in Fig. 11 which comprise the switch 77 previously described and a kickdown switch 96. The kickdown switch comprises contacts 97 and 98 and a switch arm or blade 99. The switch arm 99 is normally held out of contact with the contacts 97 and 98 by means of a spring 100. The switch 96 is arranged to be actuated by the accelerator 88 of the vehicle when the accelerator is moved to an open throttle kickdown position so as to move the switch blade 99 in contact with the contacts 97 and 98.

The switches 96 and 77 are connected with the ignition circuit for the internal combustion engine of the vehicle comprising an ignition coil 101 having a primary winding 102 and a secondary winding 103 which is connected with the spark plugs (not shown) of the engine in accordance with well-known practice. The primary winding 102 is connected in series with the usual interrupter switch 104 which is grounded and is actuated by a suitable cam 105 for causing the switch 104 to open and close to produce current surges in the primary winding 102 and high instantaneous voltages in the winding 103. The coil 101 and switch 104 are connected through the usual ignition switch 106 of the vehicle with the vehicle battery 107 which is grounded at one terminal. One contact 78 of the switch 77 is grounded, as shown, and the other contact 78 of the switch is connected with the contact 98 of the switch 96. The contact 97 of the switch 96 is connected to a point between the interrupter switch 104 and the primary winding 102 of the ignition coil 101 as shown.

The accelerator 88 has any suitable connections with the throttle lever 108 of the vehicle engine carburetor 109. These connections may comprise a bell-crank 110 having one of its arms connected by means of a link 111 with the throttle lever 108 and its other arm connected by means of a link 112 with the accelerator 88.

The hydraulic and electrical transmission control system functions to propel the control pawl 34 inwardly into engagement with the slotted element 35 under certain conditions and to withdraw the pawl 34 from the slotted element under other conditions. As has been described, when the pawl 34 is in engagement with the slotted element 35 for holding the sun gear 20 stationary, the transmission drives in overdrive speed ratio, while, when the pawl 34 is out of mesh with the slotted element 35, the drive is through the one-way clutch 14 to the driven shaft, assuming that the collar 25 is in its illustrated position with the teeth 22 and 24 out of mesh.

The pump 39 provides a volume of fluid to the fluid discharge passage 52 that varies in accordance with the speed of the driven shaft 11 of the transmission. The eccentric 44 rotates with the shaft 11 and functions to reciprocate the piston 45 in and out of the cavity in which it is disposed in the casing portion 47. When the eccentric 44 rotates during one-half revolution in the counterclockwise direction from its position in which it is illustrated in Fig. 3 as in forward drive of the vehicle, the piston 45 moves upwardly as seen in this figure due to the action of the spring 46 and draws fluid from the sump 49 through the passage 48 and past the ball 50 into the cavity in which the piston 45 reciprocates. The piston 45 under these conditions creates a suction causing the ball 50 to move off its seating washer 51 and permit this flow of liquid. The suction in the piston cavity acts also on the ball 53 and tends to hold it on its seat 54, augmenting the action of the spring 55. When the eccentric 44 rotates during the second one-half revolution, the piston 45 moves downwardly in its cavity, moving the ball 50 back on its seating washer 51 to prevent fluid flow past the ball 50, and the liquid that has been drawn into the cavity for the piston 45 is forced past the ball 53, this downward movement of the piston creating a fluid pressure that causes the ball 53 to move off its seat 54 against the action of the spring 55. The reciprocating piston 45 thus supplies fluid under pressure to the passage 52, and the volume of the fluid increases with the speed of the eccentric 44 and the driven shaft 11, as is apparent.

The pressure of the fluid in the conduit 65 connected with the passage 52 by means of the conduit 56 is regulated by the orifice 42. As the speed of the driven shaft 11 and the eccentric 44 increases, the volume output of the pump 39 increases tending to force more and more fluid through the orifice 42; however, the orifice with increasing volume of fluid flow therethrough produces a rising impedance to the flow of fluid, so that the fluid pressure in the passages 52 and 65 increases with the speed of the driven shaft 11. The driven shaft 11 is assumed to be given this increase of speed through the one-way direct drive power train including the one-way clutch 14 when the pawl 34 is out of engagement with the slotted element 35 due to action of the spring 70, with the accelerator 88 being out of its closed throttle position and with the vehicle engine driving. The size of the orifice 42 may be adjusted by moving the valve element 66 toward or away from the adjacent end of the passage 65 for effectively increasing or decreasing the size of the orifice 42 for changing the amount of pressure rise with respect to increasing speed of the shaft 11.

The fluid pressure in the conduit 65 is impressed on the end of the valve piston 59 and tends to move the valve piston to the left as seen in Fig. 10 against the action of the spring 69. The valve piston 59 is yieldably held in either of two positions by means of the ball 63 pressed into either the groove 61 or the groove 62. The valve piston 59, until the fluid pressure reaches a predetermined value, is in its downshifted position in which it is illustrated in Fig. 10 with the ball 63 in the groove 61 of the piston. When the driven shaft 11 reaches a predetermined speed corresponding with a predetermined rise in fluid pressure in the conduit 65, the fluid pressure in this conduit causes the valve piston 59 to move to the left as seen in Fig. 10 against the action of the spring 69 into its upshifted position, and the detent ball 63 is effective to yieldably hold the valve piston in this shifted position with the ball 63 being disposed in the groove 62 of the piston 59.

When the valve piston 59 is in its upshifted position with the ball 63 being in the groove 62, the piston is out of blocking relation with the passage 76 (see Fig. 6) and allows fluid to flow from the passage 65 through the passage 76 to the piston 68 of the fluid motor 41. This fluid pressure applied to the piston 68 moves the piston against the action of the springs 70 and 74; however, there is substantially no movement of pawl 34 and its rod 72 at this time due to the fact that the oscillatable blocker 36 is now in its position in which its blocking surface 37 is in the path of movement of the pawl 34 toward the slotted element 35.

The pawl 34 under these conditions is cocked for movement into engagement with the slotted element 35, and upon a release of the vehicle accelerator, the pawl 34 moves into engagement with the slotted element 35 for completing the overdrive power train through the transmission. A release of the vehicle accelerator causes the speed of the drive shaft 10 connected with the vehicle engine to decrease with respect to the speed of the driven shaft 11 with an attendant overrunning of the one-way clutch 14. The ring gear 19 of the planetary gear set 13 is connected with the driven shaft 11 and the carrier 22 of the gear set is connected with the drive shaft 10 as has been described, and during this decrease in speed of the drive shaft 10 with respect to the driven shaft 11, the slotted element 35 decreases in speed of rotation from its speed at which it rotates during a one-to-one drive through the one-way clutch 14 until the slotted element ceases to rotate and reverses its direction of rotation slightly. With this reversal of rotation of the slotted element 35, the blocker ring 36 in frictional engagement therewith oscillates from its pawl blocking position in which its land 37 is in the path of movement of the pawl 34, and the pawl is then free to move between the blocking lands 37 and 38 of the blocker 36 into engagement with the slotted element 35. The spring 74 is compressed when fluid pressure is applied to the piston 68 as has been described, and this spring moves the pawl rod 72 and the pawl 34 to cause this engagement of the pawl. When the pawl rod 72 thus moves, the ball 81 moves out of the groove 82 so that the switch arm 80 closes the contacts 78 to condition the system for a kickdown which will hereinafter be described. The transmission is now operated in overdrive speed ratio, the change from direct drive having been initiated by a release of the accelerator 88 after the speed of the driven shaft 11 has reached a predetermined value sufficient to move the valve piston 59.

As has been previously described, the valve 43 is also in communication with the piston 68 by means of the passage 87 (see Fig. 2); however, in the normal position of the valve piston 83 of the valve, the conduit 87 is blocked with respect to the bleed passage 67 connected to discharge into the sump 49, so that no fluid applied to the piston 68 may escape through the valve 43 to decrease the fluid pressure on the piston 68.

A change downwardly in speed ratio from overdrive speed ratio to direct drive may be obtained by moving the accelerator 88 to an open throttle kickdown position. When the accelerator is moved to this position, it actuates the switch 96, causing the switch blade 99 to connect the contacts 97 and 98. As has been described, when the pawl 34 is in its overdrive position engaged with the slotted element 35, the switch 77 is closed, and the point midway between the ignition coil 101 and the interrupter switch 104 is thereby grounded, since the switches 96 and 77 are in series, and the ignition system of the vehicle is disabled. As is well-known, the ordinary ignition system of a vehicle which is illustrated, due to the action of the interrupter switch 104 causes intermittent pulses of current to flow through the primary winding 102 of the ignition coil 101 for providing the high voltages in the secondary winding 103 of the ignition coil, and a grounding of this point between the ignition coil and interrupter switch stops the intermittent breaking of the circuit through the primary winding 102 so that the high voltages in the secondary winding 103 for spark plug firing are not present. The switches 77 and 96 thus produce a reversal of torque, from a condition in which the vehicle engine is driving to a condition in which the driven shaft 11 tends to drive the drive shaft 10, and the pawl 34 at this reversal of torque may be pulled out of engagement with the slotted element 35.

A movement of the accelerator 88 to its open throttle kickdown position also actuates the valve 43. The bell-crank 90 is rotated in the clockwise direction as seen in Fig. 11 through the action of the rod 89 which comes in contact with an arm of the bell-crank, and this motion of the bell-crank is transmitted through the Bowden wire 91 to the valve piston 83 to move the valve piston upwardly as seen in Fig. 7 and connect the passages 87 and 67 which allows the fluid under pressure acting on the piston 68 to drain to the sump 49. The spring 70 tends to return the piston 68 back into the position in which it is illustrated in Fig. 2, and the piston acts on the collar 73 fixed on the rod 72 and tends to move the rod 72 and pawl 34 back into their illustrated positions. The pawl 34 is free to move out of engagement with the slotted element 35, the thrust between the slotted element 35 and the pawl 34 which is present when the transmission is operative for driving the shaft 11 from the shaft 10 in overdrive speed ration being relieved when the accelerator functions by means of the switch 96 to ground the ignition system as has just been described, and the spring 70 is thus effective to pull the pawl 34 out of engagement with the slotted element 35. The switch 77 is opened when the pawl 34 returns to its position in which it is illustrated in Fig. 2 since the ball 81 moves back into the groove 82, and the grounding circuit for the ignition coil 101 through the switches 96 and 77 is broken, so that the ignition system is again operative to return the vehicle engine to operating condition, and the drive is resumed between the shafts 10 and 11 through the one-way clutch 14.

As has been previously explained, the parts of the transmission may be locked up so that a one-to-one, two-way drive is provided between the shafts 10 and 11 by engaging the clutch teeth 23 and 24. The control button 93 is utilized for this purpose. When the button is moved from its overdrive to its lockup positions indicated in Fig. 11, the lever 33 is rotated at a clockwise direction so that the eccentric located on an end of the attached shaft 30 moves the rail 27 to the right as seen in Fig. 1 and through the intermediary of the spring 28 moves the shift fork 26 and collar 25 in the same direction for thereby moving the sun gear 20 to engage the teeth 23 with the teeth 24. The control button 93 when so actuated is also effective to rotate the bell-crank 90 through the lost motion connection 95 to move the valve piston 83 in the same manner as under actuation by the vehicle accelerator when the latter is moved to its open throttle kickdown position. Such movement of the valve piston 83 relieves fluid pressure acting on the piston 68 in the motor 41 so that the pawl 34 is not urged into engaging relation with the slotted element 35 regardless of the speed that the driven shaft 11 attains, and this arrangement thus assures that there is no tendency for the transmission to drive at overspeed ratio at the same time as the one-to-one, two-way drive is effective.

My improved overdrive control system advantageously allows for control of the transmission under the influence of the vehicle accelerator with a minimum of electrical equipment. The hydraulic pump 39 operated by the driven shaft 11 advantageously functions with the orifice 42 as a governor for shifting the valve 40 and the piston 68 of the motor 41 for the pawl 34 at a certain vehicle speed. The orifice 42 may be changed in effective size by adjustment of the valve element 66 toward or away from the adjacent end of the passage 65 for changing the speed of the driven shaft 11 at which the piston 68 is moved to compress the springs 70 and 74.

I wish it to be understood that my invention is not to be limited to the specific constructions, arrangements and devices shown and described, except only insofar as the claims may be so limited, as it will be understood to those skilled in the art that changes may be made without departing from the principles of the invention.

I claim:

1. In a transmission system, the combination of a drive shaft, a driven shaft, means for providing a plurality of power trains of different speed ratios between said shafts and including a reciprocable pawl adapted to move into engagement with a slotted element for completing one of the power trains, means for supplying a fluid pressure that varies in accordance with the speed of the driven shaft and including a pump driven by said driven shaft and means forming an orifice for the fluid discharged by the pump which orifice is effective under all operative conditions of the system to vary the pressure of said fluid in accordance with driven shaft speed, a fluid pressure operated motor for moving said pawl, and a valve at all times subject to the fluid pressure as varied by said orifice in accordance with driven shaft speed and adapted to be moved from one position to another position by said fluid pressure when it reaches a predetermined value corresponding to a predetermined rise in driven shaft speed for connecting said pump with said fluid pressure motor on such movement of the valve for causing a change from one speed ratio to another, and means for returning said valve to said one position when the fluid pressure decreases to a second predetermined value corresponding to a second predetermined driven shaft speed to thereby cause a return to said one speed ratio.

2. In a transmission system for an automotive vehicle having an accelerator, the combination of a drive shaft, a driven shaft, means for providing a low speed ratio power train and a high speed ratio power train between said shafts and including an engaging mechanism and a fluid pressure operated motor for engaging the same to complete the high speed power train, means for changing the drive through the transmission from one of said power trains to the other and including a fluid pressure shifted valve having one position corresponding to said low speed ratio and having a second position corresponding to said high speed ratio, governor means providing a fluid pressure that varies in accordance with the speed of said driven shaft and effective on said valve for shifting the valve from its low speed position to its high speed position when the pressure increases to a predetermined value and including a pump driven by said driven shaft and means providing a restricted orifice for the discharge by said pump which orifice is effective when the valve is in either of its positions to vary the pressure of said fluid in accordance with driven shaft speed, said valve connecting said pump and said motor in the high speed position of said valve for operating the motor, means for returning said valve to said low speed position when the fluid pressure decreases to a second predetermined value, and means under the control of said accelerator for relieving fluid pressure applied to said hydraulic motor regardless of the position of said valve when the accelerator is moved to an open throttle position for changing the speed ratio of the transmission from said high speed ratio to said low speed ratio when the accelerator is moved to an open throttle kickdown position.

3. In a transmission for an automotive vehicle, the combination of a drive shaft, a driven shaft, a planetary gear set connected with both of said shafts and having a rotatable slotted reaction element which when held stationary completes a drive between said shafts, a pawl for engaging said slotted reaction element to hold it stationary, a hydraulic motor for moving said pawl into engagement with said element, a pump driven by said driven shaft for supplying a volume of fluid that varies in accordance with the speed of said driven shaft, a fluid supply conduit connecting said pump with said motor, a restricted orifice in said conduit for providing a fluid pressure therein that varies in accordance with the speed of said driven shaft, a pressure responsive valve disposed in said conduit between said orifice and said motor and subject to the pressure as varied by said orifice and movable into a pawl actuating position when the pressure reaches a value corresponding to a predetermined speed of said driven shaft to thereby connect said pump with said motor for causing engagement of said pawl with said rotatable element for completing said drive, and means for varying the size of said orifice to thereby cause said valve to be moved into its said pawl actuating position at different driven shaft speeds.

4. In a transmission system, the combination of a drive shaft, a driven shaft, a gear set connected between said shafts and having a reaction element which when held stationary completes a drive between the shafts, a brake for holding said reaction element stationary, a fluid pressure actuated motor for actuating said brake, fluid pressure supply means comprising a pump driven by said driven shaft and including a restricted orifice for at all times metering the fluid discharged by said pump and providing a fluid pressure that varies in accordance with the speed of said driven shaft, and a shiftable valve responsive to the metered fluid pressure regardless of the position of the valve and disposed between said pump and said motor for controlling the application of said metered fluid pressure to said motor, said valve shifting to one position when the metered fluid pressure increases to a value corresponding to a predetermined driven shaft speed and in said position connecting said pump with said motor and said valve shifting to another position when the metered fluid pressure decreases to a value corresponding to a second predetermined driven shaft speed and in said latter position being effective to disconnect said pump from said motor.

5. In a transmission system, the combination of a drive shaft, a driven shaft, a gear set connected between said shafts and having a reaction element which when held stationary completes a drive between the shafts, a brake for holding said reaction element stationary, a fluid pressure actuated motor for actuating said brake, fluid pressure supply means comprising a pump driven by said driven shaft and including a restricted orifice for at all times metering the fluid discharged by said pump and providing a fluid pressure that varies in accordance with the speed of said driven shaft, a shiftable valve responsive to the metered fluid regardless of the position of the valve and disposed between said pump and said motor for controlling the application of said metered fluid pressure to said motor, said valve being shiftable to either of two positions, said metered fluid pressure being effective upon increasing to a value corresponding to a predetermined driven shaft speed to shift the valve to one of its said positions and the valve while in said one position connecting said pump with said motor, detent means tending to hold said valve in said one position, and means biasing said valve toward its other position and effective when the metered fluid pressure decreases to a value corresponding to a second predetermined driven shaft speed to overcome said detent means and return said valve to its other position wherein said motor is disconnected from said pump.

6. In a transmission system, the combination of a drive shaft, a driven shaft, a gear set connected between said shafts and having a slotted reaction element which when held stationary completes a drive between the shafts, a brake for holding said reaction element stationary and comprising a reciprocable pawl adapted to enter a slot in said slotted reaction element to hold said element stationary to complete said drive, a fluid pressure actuated motor for moving said pawl toward said slotted element, fluid pressure supply means comprising a pump driven by said driven shaft and including a restricted orifice for at all times metering the fluid discharged by said pump and providing a fluid pressure that varies in accordance with the speed of said driven shaft, and a shiftable valve responsive to the metered fluid pressure regardless of the position of the valve and disposed between said pump and said motor for controlling the application of said metered fluid pressure to said motor, said valve shifting to one position when the metered fluid pressure increases to a value corresponding to a predetermined driven shaft speed and in said position connecting said pump with said motor for thereby moving said pawl into a slot in said slotted element to complete said drive and said valve shifting to another position when the metered fluid pressure decreases to a value corresponding to a second predetermined driven shaft speed and in said latter position being effective to disconnect said pump from said motor to break said drive.

7. In a transmission system, the combination of a drive shaft, a driven shaft, a gear set connected between said shafts and having a slotted reaction element which when held stationary completes a drive between the shafts, a brake for holding said reaction element stationary and comprising a reciprocable pawl adapted to enter a slot in said slotted reaction element to hold said element stationary to complete said drive, a fluid pressure actuated motor for moving said pawl toward said slotted element, fluid pressure supply means comprising a pump driven by said driven shaft and including a restricted orifice for at all times metering the fluid discharged by said pump and providing a fluid pressure that varies in accordance with the speed of said driven shaft, a shiftable valve responsive to the metered fluid pressure regardless of the position of the valve and disposed between said pump and said motor for controlling the application of said metered fluid pressure to said motor, said valve being shiftable to either of two positions, said metered fluid pressure being effective upon increasing to a value corresponding to a predetermined driven shaft speed to shift the valve to one of its said positions and the valve while in said one position connecting said pump with said motor for thereby moving said pawl into a slot in said slotted element to complete said drive, detent means tending to hold said valve in said one position, and means biasing said valve toward its other position and effective when the metered fluid pressure decreases to a value corresponding to a second predetermined driven shaft speed to overcome said detent means and return said valve to its other position, said valve while in said other position being effective to disconnect said pump from said motor to break said drive.

8. In power transmission mechanism, the combination of a drive shaft, a driven shaft, means for providing low and high speed drives between said shafts, means subject to changes in fluid pressure for changing the drive from said low speed drive to said high speed drive in response to increases in fluid pressure and for changing the drive from said high speed drive back again to said low speed drive in response to decreases in fluid pressure, a pump for supplying fluid under pressure having a fluid outlet and driven by one of said shafts, means forming an orifice connected with the outlet of said pump for relieving the pressure supplied by said pump to cause the pressure to increase with increases in speed of said one shaft and to decrease with decreases in speed of said one shaft, a plug movable toward and away from said orifice for varying the effective size of the orifice, and means for connecting the outlet of said pump with said drive changing means whereby the drive changing means causes a change from said low speed drive to said high speed drive in response to said increase in pressure due to said orifice on increasing speeds of said one shaft and causes a change back again from said high speed drive to said low speed drive in response to said decrease in pressure due to said orifice on decreasing speeds of said one shaft.

9. In power transmission mechanism, the combination of a drive shaft, a driven shaft, means for providing low and high speed drives between said shafts, means subject to changes in fluid pressure for changing the drive for said low speed drive to said high speed drive in response to increases in fluid pressure and for changing the drive from said high speed drive back again to said low speed drive in response to decreases in fluid pressure, a fixed displacement pump for supplying fluid under pressure having a fluid inlet and a fluid outlet and driven by said driven shaft, means forming a fluid sump with which said inlet is connected, means forming an orifice connected with the outlet of said pump and adapted to discharge into said sump for relieving the pressure supplied by said pump to cause the pressure to increase with increases in speed of said driven shaft and to decrease with decreases in speed of said driven shaft, a plug having a tapered end movable toward and away from said orifice for varying the effective size of the orifice, and means for connecting the outlet of said pump with said drive changing means whereby the drive changing means causes a change from said low speed drive to said high speed drive in response to said increase in pressure due to said orifice on increasing speeds of said driven shaft and causes a change back again from said high speed drive to said low speed drive in response to said decrease in pressure due to said orifice on decreasing speeds of said driven shaft.

10. In power transmission mechanism, the combination of a drive shaft, a driven shaft, means for providing low and high speed drives between said shafts, means subject to changes in fluid pressure for changing the drive from said low speed drive to said high speed drive in response to increases in fluid pressure and for changing the drive from said high speed drive back again to said low speed drive in response to decreases in fluid pressure, a pump for supplying fluid under pressure having a fluid outlet and driven by one of said shafts, means forming an orifice connected with the outlet of said pump for relieving the pressure supplied by said pump to cause the pressure to increase with increases in speed of said one shaft and to decrease with decreases in speed of said one shaft, means for connecting the outlet of said pump with said drive changing means whereby the drive changing means causes a change from said low speed drive to said high speed drive in response to said increase in pressure due to said orifice on increasing speeds of said one shaft and causes a change back again from said high speed drive to said low speed drive in response to said decrease in pressure due to said orifice on decreasing speeds of said one shaft, and means for selectively relieving the fluid under pressure supplied by said pump for rendering said drive changing means operable to cause a change from said high speed drive to said low speed drive above speeds of said one shaft at which said high speed drive would otherwise be effective.

11. In power transmission mechanism for an automotive vehicle, the combination of a drive shaft, a driven shaft, an accelerator for controlling the speed of the vehicle and having a full open throttle position, means for providing low and high speed drives between said shafts, means subject to changes in fluid pressure for changing the drive from said low speed drive to said high speed drive in response to increases in fluid pressure and for changing the drive from said high speed drive back again to said low speed drive in response to decreases in fluid pressure, a pump for supplying fluid under pressure having a fluid outlet and driven by one of said shafts, means forming an orifice connected with the outlet of said pump for relieving the pressure supplied by said pump to cause the pressure to increase with increases in speed of said one shaft and to decrease with decreases in speed of said one shaft, means for connecting the outlet of said pump with said drive changing means whereby the drive changing means causes a change from said low speed drive to said high speed drive in response to said increase in pressure due to said orifice on increasing speeds of said one shaft and causes a change back again from said high speed drive to said low speed drive in response to said decrease in pressure due to said orifice on decreasing speeds of said one shaft, and a valve connected with said accelerator for relieving the fluid under pressure from said pump for rendering said drive changing means operable to cause a change from said high speed drive to said low speed drive above speeds of said one shaft at which said high speed drive would otherwise be effective when the accelerator is moved to its said full open throttle position.

12. In power transmission mechanism, the combination of a drive shaft, a driven shaft, means for providing a plurality of different drives between said shafts, means for changing from one of said drives to another and including a reciprocable control valve having a first position corresponding to said one of said drives and shiftable to a second position corresponding to the other of said drives, a pump driven by one of said shafts and connected by means of a conduit to supply fluid under pressure to said valve tending to shift the valve from its first position to its second position, means defining a relief orifice in constant communication with said conduit for relieving the pressure therein and varying the pressure therein so that it increases with the speed of the shaft which drives said pump, and means acting on said valve in opposition to the fluid pressure as varied by the orifice for allowing said valve to shift from its said first position to its said second position on a predetermined increase in pressure from said pump and for returning the valve from its second position to its first position on the fluid pressure from said pump decreasing to a predetermined value due to said orifice.

13. In power transmission mechanism, the combination of a drive shaft, a driven shaft, means for providing a plurality of different drives between said shafts, means for changing from one of said drives to another and including a reciprocable control valve having a first position corresponding to said one of said drives and a second position corresponding to said other of said drives, a pump driven by one of said shafts and connected by means of a conduit to supply fluid under pressure to said valve tending to shift the valve from its first position to its second position, means defining a relief orifice in constant communication with said conduit at a point disposed between said pump and said valve for relieving the pressure in the conduit and varying the pressure therein so that it increases with the speed of the shaft which drives said pump, and means acting on said valve in opposition to the fluid pressure as varied by the orifice for allowing said valve to shift from its said first position to its said second position on a predetermined increase in pressure from said pump and for returning the valve from its second position to its first position on the fluid pressure from said pump decreasing to a predetermined value due to said orifice.

14. In a transmission system, the combination of a drive shaft, a driven shaft, means for providing relatively low and high speed drives between said shafts, means for changing from one of said drives to another and including a reciprocable control valve having a low speed position corresponding to said low speed drive and shiftable to a high speed position corresponding to said high speed drive, a pump driven by said driven shaft and connected by means of a conduit to supply fluid under pressure to said valve for shifting it from its low speed position to its high speed position, means defining a relief orifice in constant communication with said conduit irrespective of the position of said valve and effective to relieve the pressure in said conduit and vary the pressure therein in accordance with the speed of said driven shaft, and means acting on said valve in opposition to the fluid pressure as varied by the orifice for shifting the valve from its high speed position to its low speed position against the fluid pressure from said pump as varied by said orifice.

15. In a transmission system, the combination of a drive shaft, a driven shaft, means for providing relatively low and high speed drives between said shafts, means for changing from one of said drives to another and including a reciprocable control valve having a low speed position corresponding to said low speed drive and shiftable to a high speed position corresponding to said high speed drive, a pump driven by said driven shaft and connected by means of a conduit to supply fluid under pressure to said valve for shifting it from its low speed position to its high speed position, means defining a relief orifice in constant communication with said conduit irrespective of the position of said valve and effective to relieve the pressure in said conduit and vary the pressure therein in accordance with the speed of said driven shaft, the fluid pressure as varied by said orifice increasing in accordance with the speed of the driven shaft and being effective to shift the valve to its high speed position when the speed of the driven shaft increases to a predetermined value, and means acting on said valve in opposition to the fluid pressure as varied by the orifice for shifting the valve from its high speed position to its low speed position against the fluid pressure from said pump as varied by said orifice when the speed of the driven shaft decreases to a second predetermined value which is substantially lower than said first predetermined value.

16. In a transmission system, the combination of a drive shaft, a driven shaft, means for providing a plurality of different drives between said shafts, means for changing from one of said drives to another and including a reciprocable control valve having a first position corresponding to one of said drives and shiftable to a second position corresponding to another of said drives, a pump driven by one of said shafts and connected by means of a conduit to supply fluid under pressure to said valve for shifting it from its first position to its second position, means defining a relief orifice in constant communication with said conduit irrespective of the position of said valve and effective to relieve the pressure in said conduit and vary the pressure therein in accordance with the speed of the shaft which drives said pump so that the fluid pressure as varied by said orifice is effective to shift the valve to its second position when the speed of the shaft which drives the pump reaches a predetermined value, means acting on said valve in opposition to the fluid pressure as varied by the orifice for shifting the valve from its said second position to its said first position against the fluid pressure from said pump as varied by said orifice, and manually controlled means for relieving the pressure in said conduit to render the means acting on the valve in opposition to the fluid pressure as varied by the orifice effective for shifting the valve to its first position and maintaining the valve in this position irrespective of the speed of the shaft which drives the pump.

References Cited in the file of this patent

UNITED STATES PATENTS

| Number | Name | Date |
|---|---|---|
| 2,177,872 | Dunn | Oct. 31, 1939 |
| 2,214,099 | Claytor | Sept. 10, 1940 |
| 2,238,746 | Neracher | Apr. 15, 1941 |
| 2,255,020 | Barnes | Sept. 2, 1941 |
| 2,311,209 | Carnagua | Feb. 16, 1943 |
| 2,314,554 | Pennington | Mar. 23, 1943 |